United States Patent
Müller

(10) Patent No.: US 11,261,948 B2
(45) Date of Patent: Mar. 1, 2022

(54) ELECTROMOTIVE FURNITURE DRIVE COMPRISING A GEAR ASSEMBLY HAVING AN INTERMEDIATE SHAFT

(71) Applicant: DewertOkin GmbH, Kirchlengern (DE)

(72) Inventor: Sven Müller, Kirchlengern (DE)

(73) Assignee: DEWERTOKIN TECHNOLOGY GROUP CO., LTD, Jiaxing (CN)

( * ) Notice: Subject to any disclaimer, the term of this patent is extended or adjusted under 35 U.S.C. 154(b) by 0 days.

(21) Appl. No.: 16/982,928

(22) PCT Filed: Mar. 22, 2019

(86) PCT No.: PCT/EP2019/057270
§ 371 (c)(1),
(2) Date: Sep. 21, 2020

(87) PCT Pub. No.: WO2019/180219
PCT Pub. Date: Sep. 26, 2019

(65) Prior Publication Data
US 2021/0018077 A1    Jan. 21, 2021

(30) Foreign Application Priority Data

Mar. 22, 2018 (DE) ..................... 10 2018 106 788.7

(51) Int. Cl.
*F16H 25/20* (2006.01)
*F16H 1/20* (2006.01)
*A47C 20/04* (2006.01)

(52) U.S. Cl.
CPC ............ *F16H 25/20* (2013.01); *F16H 1/203* (2013.01); *A47C 20/041* (2013.01);
(Continued)

(58) Field of Classification Search
CPC .. F16H 25/20; F16H 1/203; F16H 2025/2081; F16H 2025/2046; F16H 2025/204; F16H 2025/2031; A47C 20/042
See application file for complete search history.

(56) References Cited

U.S. PATENT DOCUMENTS 2,398,841 A    3/1943  Morris
3,176,963 A *  4/1965  Sturm ................. F16H 25/2472
                                                    254/103
(Continued)

FOREIGN PATENT DOCUMENTS

DE    102 54 125    6/2004
DE    102 54 127    6/2004
(Continued)

OTHER PUBLICATIONS

International Search Report issued by the European Patent Office in International Application PCT/EP2019/057270 dated May 23, 2019.

*Primary Examiner* — David M Fenstermacher
(74) *Attorney, Agent, or Firm* — Henry M. Feiereisen LLC

(57) ABSTRACT

An electromotive furniture drive includes a drive motor including an output shaft, a lift spindle arranged in a common plane with the output shaft, and a gear assembly configured to couple the output shaft of the drive motor to the lift spindle. The gear assembly includes an intermediate shaft which intersects the common plane between the lift spindle and the output shaft.

17 Claims, 6 Drawing Sheets

(52) U.S. Cl.
CPC ...... *A47C 20/042* (2013.01); *F16H 2025/204* (2013.01); *F16H 2025/209* (2013.01); *F16H 2025/2031* (2013.01); *F16H 2025/2046* (2013.01); *F16H 2025/2081* (2013.01)

(56) References Cited

U.S. PATENT DOCUMENTS

| | | | |
|---|---|---|---|
| 6,234,034 B1* | 5/2001 | Ando | F16H 25/2472 |
| | | | 187/267 |
| 9,777,797 B2* | 10/2017 | Okada | H02K 7/1163 |
| 10,619,715 B2* | 4/2020 | Tsai | F16H 25/2454 |
| 10,935,096 B2* | 3/2021 | Adoline | F16F 1/121 |
| 2003/0024338 A1* | 2/2003 | Roither | A47C 20/041 |
| | | | 74/425 |
| 2011/0061574 A1* | 3/2011 | Klinke | A47B 9/04 |
| | | | 108/147.19 |
| 2016/0114098 A1* | 4/2016 | Gao | F16H 25/20 |
| | | | 604/67 |
| 2018/0080532 A1* | 3/2018 | Oster | E05F 15/622 |
| 2018/0149245 A1* | 5/2018 | Yamashita | F16H 25/2219 |
| 2019/0351932 A1* | 11/2019 | Washnock | F16H 25/2204 |
| 2020/0047646 A1* | 2/2020 | Stan | H02K 7/116 |
| 2020/0189549 A1* | 6/2020 | Mazzarini | F16D 51/22 |
| 2020/0262470 A1* | 8/2020 | Kondo | B62D 5/0454 |
| 2020/0362947 A1* | 11/2020 | Castell | F16H 25/2015 |
| 2021/0018077 A1* | 1/2021 | Muller | F16H 1/203 |
| 2021/0025214 A1* | 1/2021 | Dora | E05F 1/1261 |
| 2021/0025483 A1* | 1/2021 | Lawlor | F16H 25/22 |
| 2021/0030164 A1* | 2/2021 | Muller | F16H 1/225 |
| 2021/0061340 A1* | 3/2021 | Wilkes | B62D 1/181 |

FOREIGN PATENT DOCUMENTS

| | | |
|---|---|---|
| DE | 202016106011 | 12/2016 |
| WO | WO 02/29284 | 4/2002 |

* cited by examiner

ELECTROMOTIVE FURNITURE DRIVE COMPRISING A GEAR ASSEMBLY HAVING AN INTERMEDIATE SHAFT

CROSS-REFERENCES TO RELATED APPLICATIONS

This application is the U.S. National Stage of international Application No. PCT/EP2019/057270, filed Mar. 22, 2019, which designated the United States and has been published as International Publication No. WO 2019/180219 A1 and which claims the priority of German Patent Application, Serial No. 10 2018 106 788.7, filed Mar. 22, 2018, pursuant to 35 U.S.C. 119(a)-(d).

BACKGROUND OF THE INVENTION

The invention relates to an electromotive furniture drive comprising a lift spindle and a drive motor, wherein the lift spindle and an output shaft of the drive motor are arranged in a common plane, and wherein the output shaft is coupled to the lift spindle via a gear assembly with an intermediate shaft.

Electromotive furniture drives are used in furniture, for example, bedroom furniture or resting furniture such as beds, sofa beds or armchairs, in order to be able to conveniently adjust at least one movable furniture part relative to another furniture part, for example by pivoting it. In a bed, for example, a back or leg section can be raised or lowered relative to a middle section of the bed.

Furniture drives with a lift spindle, often also referred to as spindle drives, are particularly suitable as linear drives whose output member can be moved linearly in relation to a main body of the furniture drive. Often two tubular profiles are provided which can be inserted one into the other, a standpipe and a lifting tube, wherein the lift spindle is arranged rotatably but stationary in relation to the standpipe and a spindle nut is coupled to the lifting tube in order to move the lifting tube out of or into the standpipe when the lift spindle is turned. In alternative designs, it may be provided that the lift spindle is designed to be displaceable but rotationally fixed and the spindle nut is driven by the drive motor and mounted rotatably but fixedly. However, a design with a stationary spindle and a movable standpipe or lifting tube that can be moved into each other is usually the more compact arrangement.

A furniture drive having a lift spindle and a drive motor with output shaft is known from the publication DE 102 54 127 A1, in which the output shaft and the lift spindle are arranged parallel to each other in a common plane. The output shaft of the drive motor is coupled to the lift spindle via a double worm gear. For this purpose, a first worm is arranged on the output shaft of the drive motor, which engages with a worm wheel of an intermediate shaft. The intermediate shaft has a second worm which meshes with a worm wheel mounted on the lift spindle. The intermediate shaft is aligned perpendicular to the direction of the output shaft and the lift spindle, A special feature of the gear unit is that it has two transmission lines in which two identically designed intermediate shafts transmit the rotary motion of the first worm to the worm wheel of the lift spindle. One of the intermediate shafts is arranged on each side of the plane in which the output shaft of the drive motor and the lift spindle are disposed. The two intermediate shafts themselves are either arranged parallel to each other or extend outwards in a V-shape as seen from the drive motor. In principle, the diameter of the motor represents a lower limit for the expansion of the furniture drive in a direction perpendicular to said plane in which the output shaft of the drive motor and the lift spindle lie.

If, when the intermediate shafts are arranged in accordance with publication DE 102 54 127 A1, the diameter of the worm wheels of the intermediate shafts is greater than half the diameter of the motor housing, the edges of the worm wheels of the intermediate shafts project beyond the motor housing in a direction perpendicular to the said plane and determine the minimum extension of the housing of the furniture drive in this direction. However, due to the desired transmission ratio between the drive motor and the lift spindle, and in order to achieve a good engagement between the worm and worm wheel, a diameter of the worm wheels cannot be selected to be arbitrarily small.

It is an object of the present invention to create an electromotive furniture drive of the type mentioned above in which the largest possible worm gears can be used in the gear assembly without these gears opposing a compact design of the electromotive furniture drive.

SUMMARY OF THE INVENTION

This object is solved by an electromotive furniture drive with the features of independent claim. Advantageous designs and further developments are the subject matter of the dependent claims.

An electromotive furniture drive of the type mentioned above is characterized in that the intermediate shaft of the gear assembly intersects the plane in which the lift spindle and the output shaft lie, between the lift spindle and the output shaft. The intermediate shaft lies correspondingly transversely between the lift spindle and the output shaft and thus also transversely in the (gear) housing and engages in the lift spindle and output shaft on different sides of the latter. The available space can thus be better utilized, allowing the housing and thus also the furniture drive to be constructed in a particularly compact way.

In an advantageous design of the electromotive furniture drive, the gear assembly is designed as a double worm gear, wherein the intermediate shaft has an intermediate wheel in which a worm of the output shaft of the drive motor engages and another worm which engages in a spindle wheel of the lift spindle.

Alternatively, the gear assembly can be a combination of a worm gear and a helical gear, wherein the intermediate shaft has an intermediate wheel in which a worm of the output shaft of the drive motor engages and a helical gear which engages a helical gear of the lift spindle.

Preferably, the intermediate shaft intersects the plane at an angle of 30° to 75° and particularly preferably from 35° to 45°. Due to the inclined position of the intermediate shaft in the housing, the intermediate wheel is also arranged at an angle to housing sides, which means that the intermediate wheel can be designed larger than if it lies in a plane parallel or perpendicular to a housing side.

In a further advantageous design, the electromotive furniture drive has a housing in which the gear assembly is accommodated and from which, on one side, a motor housing of the drive motor and a standpipe protrude parallel to one another, wherein a lifting tube is mounted in the standpipe so as to be linearly displaceable and is coupled to a spindle nut which interacts with the lift spindle. Preferably, the housing has two parallel longitudinal sides which are spaced apart from each other, wherein a diameter of the intermediate wheel is greater than or equal to half the distance between the longitudinal sides. The spacing of the longitudinal sides, i.e. the expansion of the housing in the direction perpendicular to the longitudinal sides, can thus in one configuration essentially correspond to one dimension of the motor housing in this direction. In other words, the housing can be designed so narrow in this direction that it is not or only slightly wider than the motor housing.

In another advantageous design, the output shaft is located centrally between the parallel longitudinal sides, whereas the lift spindle is located eccentrically between the parallel longitudinal sides. This provides more space on the side where the intermediate shaft interacts with the lift spindle, for example to be able to support the intermediate shaft in the housing.

In another advantageous design of the electromotive furniture drive, the housing is constructed in two parts and has an upper and a lower part. The drive motor and a standpipe are arranged on the upper part. The lower part is placed on the upper part on a side opposite these components. The lower part comprises a fork head or a comparable connection possibility of the electromotive furniture drive. The fork head or the connection possibility is preferably designed with the lower part and is in alignment with the lifting tube.

In another advantageous design of the electromotive furniture drive, the intermediate shaft is mounted with bearing journals in plain bearings, with bearing shells formed in the upper and lower parts. Preferably, a half-shell-shaped bearing shell in the upper part and a half-shell-shaped bearing shell in the lower part complement each other to form a plain bearing for one of the bearing journals. This type of bearing for the intermediate shaft saves space and therefore has little or no effect on the size of the housing. It is also cost-effective and the intermediate shaft is easy to install.

In another advantageous design of the electromotive furniture drive, the upper part of the housing has a raised dome in the area of the standpipe, into which the standpipe is positively inserted at the side. Any transverse forces acting on the standpipe (i.e. forces acting transversely to the lifting direction of the lifting tube) can thus be transferred to the housing. The standpipe only needs to be connected to the housing with regard to its longitudinal direction by means of positive locking that is as accurate as possible. This is preferably achieved by the standpipe having at least one transverse groove in an outer wall, wherein a clamping ring is placed around the standpipe which engages in the at least one transverse groove. The clamping ring is placed around the standpipe and the latter is pushed into the upper part of the (still open) housing with the clamping ring. In the upper part there is a recess which positively accommodates the clamping ring, preferably on all sides along its circumference. The lower part of the housing, which is then placed on top, is designed in such a way that it reaches up to the clamping ring at at least one, preferably several points in the lifting direction and thus also holds it in the lifting direction by positive locking.

In one design, the clamping ring can be formed from two sections which can be inserted into each other in order to insert the clamping ring around the standpipe and in its at least one transverse groove. In a design that is alternative thereto, the clamping ring is made up of two sections which are connected in a foldable manner to each other by a hinge.

BRIEF DESCRIPTION OF THE DRAWING

The invention is explained in more detail below by means of an exemplary embodiment by means of the drawings, which show as follows.

DETAILED DESCRIPTION OF PREFERRED EMBODIMENTS

Figure 1:
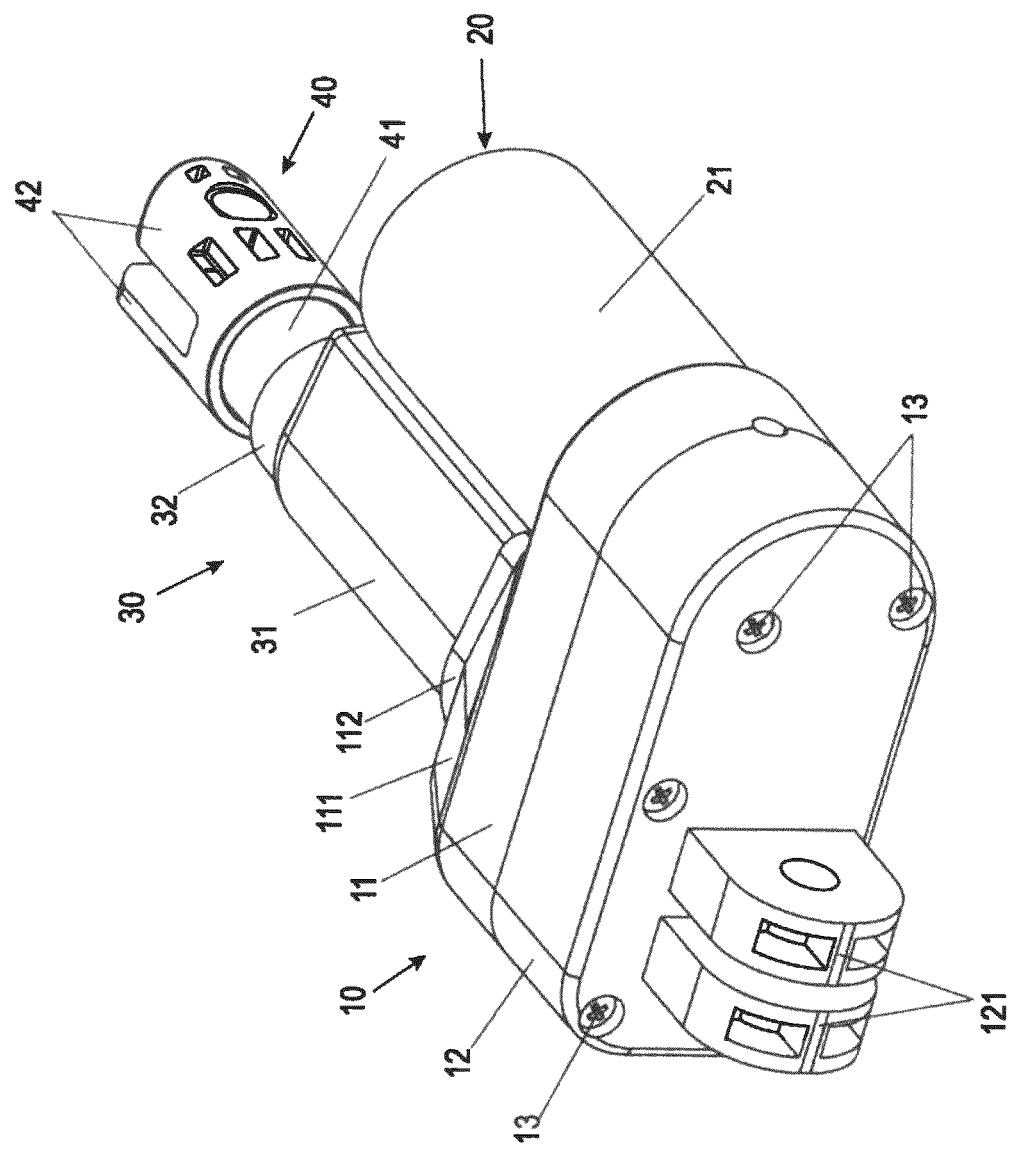
FIG. 1 shows an isometric representation of an electromotive furniture drive.

The figures show an exemplary embodiment of an electromotive furniture drive in various representations. In all figures, the same reference numerals indicate the same elements.

FIG. 1 shows the electromotive furniture drive first in an overall view in an isometric representation.

The furniture drive has a two-part housing 10, which comprises an upper part 11 and a lower part 12. Upper part 11 and lower part 12 are connected to each other with screws 13. In a further development of the illustrated furniture drive, a different type of connection between the two housing parts can be provided additionally or alternatively, for example a latching, adhesive and/or welded connection. A fork head 121 is arranged on the lower part 12, which fork head serves to couple the electromotive furniture drive to a fixed or movable furniture part or a fixed or movable part of a furniture fitting.

On the side of the housing 10 opposite to the fork head 121, the upper part 11 has a drive motor 20 and a standpipe arrangement 30 with a standpipe 31. Of the drive motor 20, only one motor housing 21 is shown in the illustration in FIG. 1. The drive motor 20 is preferably inserted with a motor flange not visible here into a recess of the upper part 11 and fastened there.

In the area of the standpipe 31, the upper part 11 is raised in relation to the area where the flange of the drive motor 20 is positioned, and has a dome 111 which ends in a collar 112 at its outer end. The standpipe 31 is inserted into this dome 111 and guided inside the dome 111. At the free end of the standpipe 31 opposite the housing 10, a guide bushing 32 is attached to the standpipe 31, in which a lifting tube 41 of a lifting tube arrangement 40 is displaceably guided.

At the outer end, a fork head 42 is attached to the lifting tube 41, which is in line with the fork head 121 and has a similar design. The fork head 42, like fork head 121, is used to connect the electric motorized furniture drive to a fixed or movable furniture part or a fixed or movable part of a furniture fitting.

The upper part 11 and the lower part 12 of the housing 10 are preferably both integral plastic parts manufactured in an injection-molding process. Likewise, the fork head 42 and the guide bushing 32 are preferably plastic elements, each of which is integrally manufactured by injection molding. The standpipe 31 and the lifting tube 41, on the other hand, are profile elements and are preferably made of a metal, especially aluminum, in order to provide the required stability in spite of low wall thicknesses.

Figure 2:
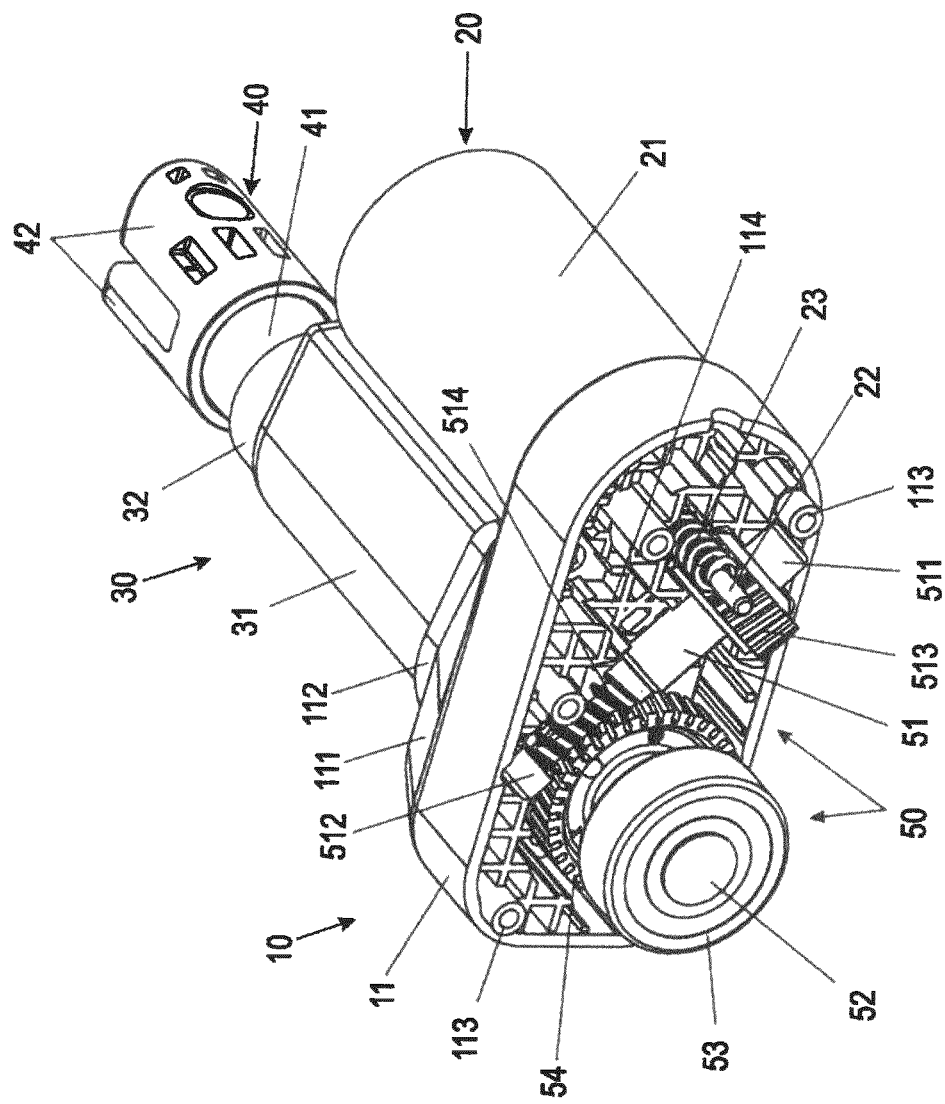
FIG. 2 shows the electromotive furniture drive from FIG. 1 with open housing.
Figure 3:
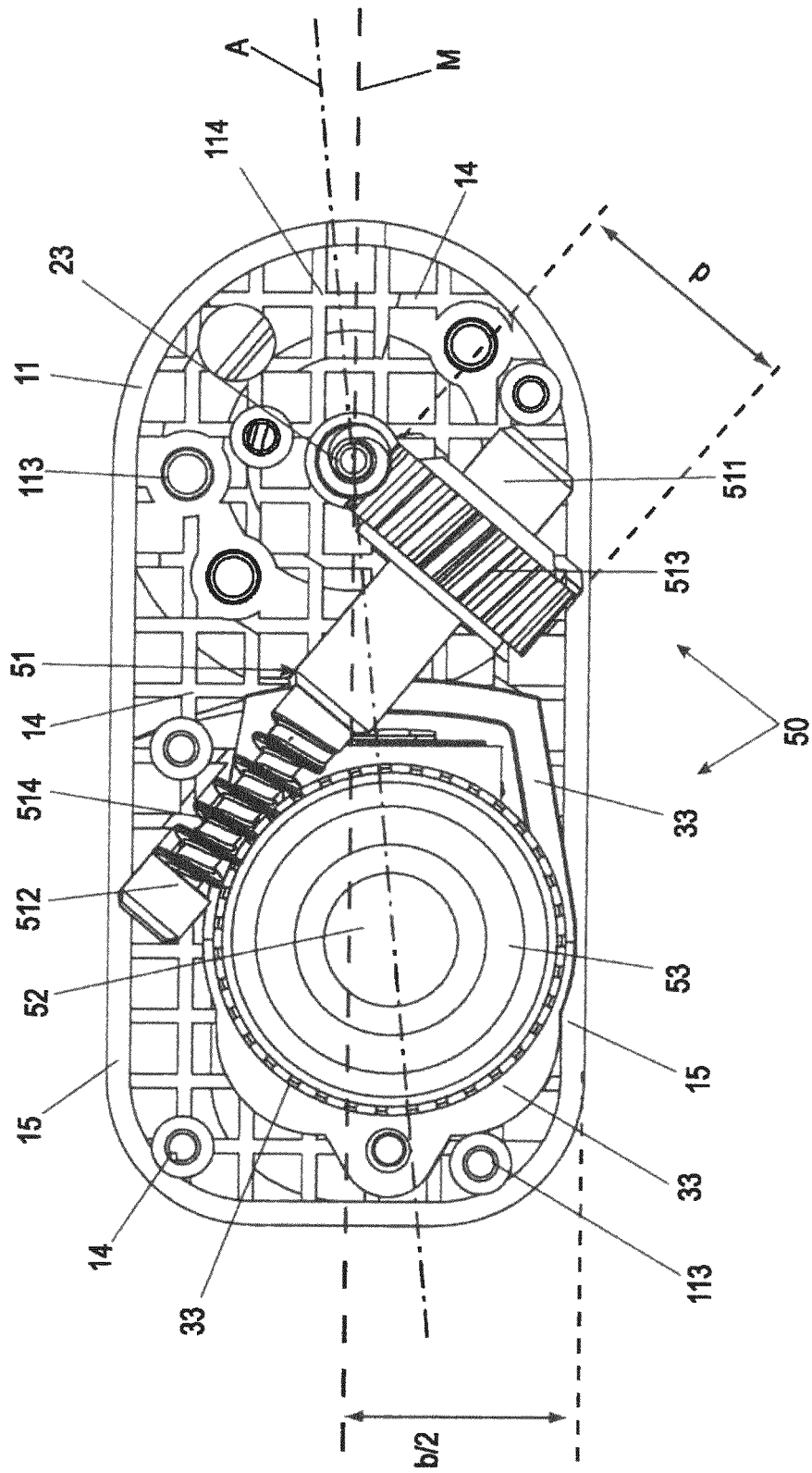
FIG. 3 shows a top view of the opened housing of FIG. 2.

FIG. 2 shows the electromotive furniture drive from FIG. 1 in the same isometric view, although the lower part 12 of the housing 10 has been removed to gain an insight into the internal structure of the furniture drive. FIG. 3 shows the opened housing 10 in a plan view of the upper part 11.

FIGS. 2 and 3 show screw domes 113 in the upper part 11, into which the screws 13 are screwed. In the lower part 11 there are corresponding screw bushings. In order to achieve a low weight and at the same time high stability, reinforcing webs 114 are formed in the upper and lower part 11, 12, e.g. as shown in a grid pattern.

A double worm gear unit 50 is accommodated in housing 10 as a gear assembly through which rotation of an output shaft 22 of the drive motor 20 is transmitted to a lift spindle 52. Only one free end of the lift spindle 52 is visible in FIGS. 2 and 3, which is mounted in a bearing 53, preferably a roller bearing. The bearing 53 is supported in the lower part 12 of the housing 10 and transmits forces from there directly to the fork head 121.

The double worm gear unit 50 comprises an intermediate shaft 51 which extends perpendicularly to the output shaft 22 and the lift spindle 52. The intermediate shaft 51 is supported in the housing 10 by bearing journals 511, 512, wherein half-shell plain bearings are formed in both the upper part 11 and the lower part 12. For assembly, the intermediate shaft 51 is inserted into the upper part 11 as shown in FIGS. 2 and 3. When closing the housing 10, the bearing shells in the upper part 11 and lower part 12 complement each other to form plain bearings for the intermediate shaft 51.

A worm, also referred to as motor worm 23 in the following, is mounted or integrally formed on the output shaft 22 and engages in a worm wheel, also referred to as intermediate wheel 513 in the following, of the intermediate shaft 51. Furthermore, a further worm 514 is formed on the intermediate shaft 51, which engages in a further worm wheel, which is mounted non-rotatably on the lift spindle 52 and is referred to as spindle wheel 54 in the following.

By designing the gear assembly as a double worm gear unit 50, a high transmission ratio between the output shaft 22 and the lift spindle 52 is achieved. Correspondingly, a high-speed drive motor 20 can be used, which generally has a smaller design for the same power as a low-speed motor. The use of a double worm gear unit already contributes to a compact design.

Furthermore, a compact design is achieved in that the intermediate shaft 51 crosses a common plane in which the output shaft 22 and the lift spindle 52 are located.

As can be seen particularly well in FIG. 3, the base of the housing 10 is essentially that of a rectangle with rounded edges. On the sides of the drive motor 20, the corners are rounded to a continuous semicircle, the diameter of which is only slightly larger than the diameter of the motor housing 21. Up and down in FIG. 3, the upper part 11 of housing 10 is bounded by parallel and straight longitudinal sides 115, In the middle between these longitudinal sides 115 there is a center plane M of the housing 10, which is marked with a dashed line in FIG. 3. Furthermore, FIG. 3 shows the plane in which the output shaft 22 and the lift spindle 52 are located. This plane is referred to below as (axial) plane A, FIG. 3 shows that the output shaft 22 is located in the center plane M of the housing 10, but the lift spindle 52 is eccentrically positioned. Accordingly, the axis plane A and the center plane M intersect in the output shaft 22. In the example shown, the intermediate shaft 51 not only intersects the axial plane A, but also the center plane M.

As a result of the inclined position of the intermediate shaft 51 in the housing 10 (in the example shown, the intermediate shaft 51 crosses the center plane M at an angle of about 40°, for example) the intermediate wheel 513 can have a diameter d (see FIG. 3) which is at least as large as the distance between the longitudinal sides 115 and the center plane M. This distance is shown as b/2 in FIG. 3, wherein b is the distance between the two longitudinal sides 115 of the housing and thus a width of the housing in the direction perpendicular to the center plane M. By inclining the intermediate shaft 51 in the housing 10, a large transmission ratio can be achieved without having to widen the housing 10 in an orientation perpendicular to the center plane M.

Furthermore, a compact housing is achieved by placing the lift spindle 52 eccentrically in housing 10 with respect to the center plane. This provides more space on the side where the worm 514 of the intermediate shaft 51 engages in the spindle wheel 54 in order to accommodate the bearing journal 512 in housing 10.

A further measure to be able to support the intermediate shaft 51 in a housing 10 which is as compact as possible and in particular to be able to use an intermediate wheel 513 which is as large as possible is to extend the bearing shells for the bearing journals 511,512 as close as possible to or, as shown, into a wall of the housing 10, In the area of the circumference of the intermediate wheel 513, the example shown also includes a recess in the wall of the housing 10 into which the intermediate wheel 513 projects in order to be able to insert an intermediate wheel 513 which is as large as possible.

Figure 4:
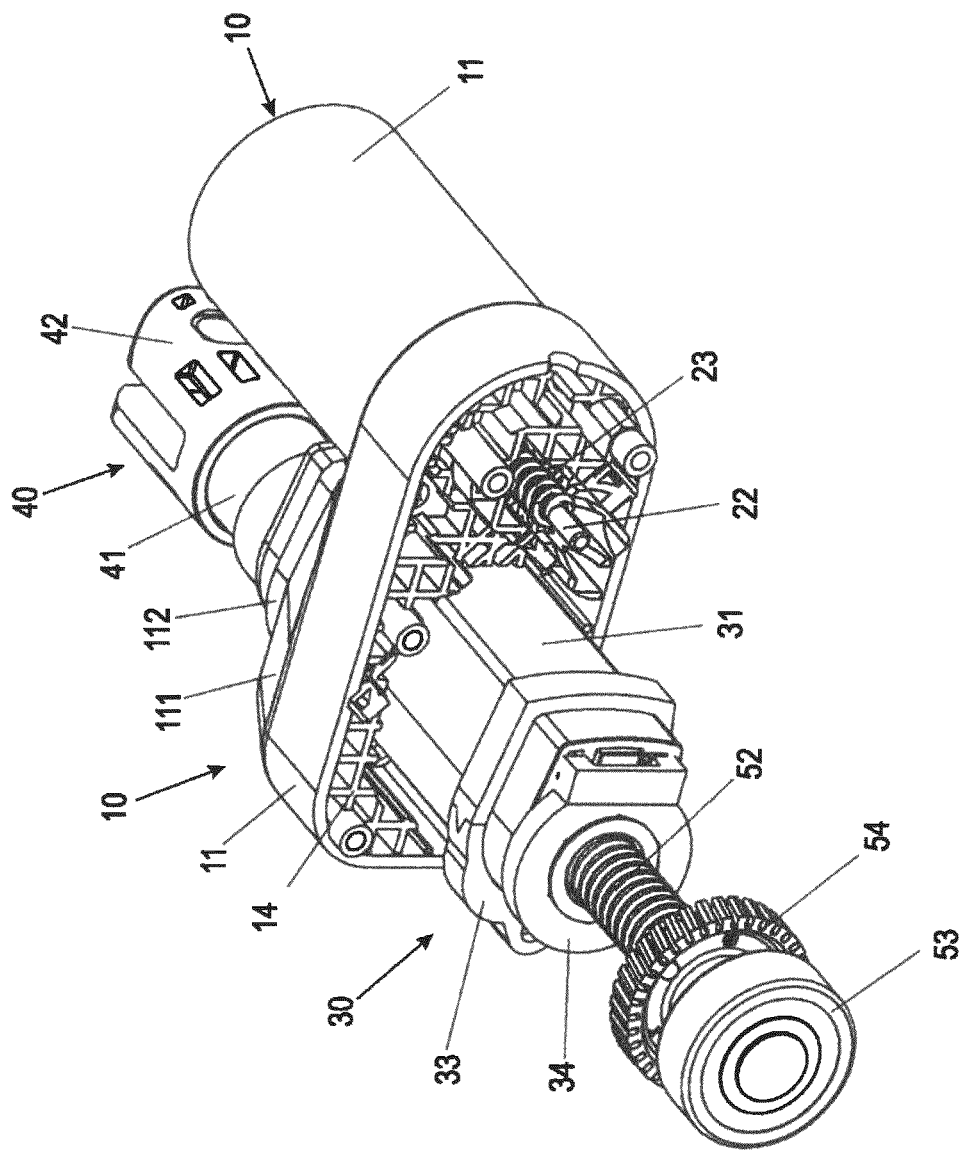
FIG. 4 shows the electromotive furniture drive of FIGS. 1 to 3 in a partially assembled state in an isometric representation.

FIG. 4 again shows an isometric representation of the electromotive furniture drive comparable to FIG. 2, although the standpipe 31 is only partially inserted to illustrate the attachment of the standpipe 31 in housing 10. This FIG. 4 also shows a threaded section of spindle 52.

As already mentioned in connection with FIG. 1, the upper part 11 of the housing 10 has a dome 111 with a collar 112, into which the standpipe 31 is inserted with a perfect fit. The standpipe 31 is described in more detail below in connection with FIG. 6. In an end area of the standpipe 31 facing the spindle wheel 54, a clamping ring 33 is placed around the standpipe 31. This clamping ring 33 engages in transverse grooves of the standpipe 31 and is therefore not displaceable in longitudinal direction in relation to the standpipe 31.

When inserting the standpipe 31 into the upper part 11, the clamping ring 33 rests in a recess in the upper part 11 adapted to its circumference. In this way the clamping ring 33 is fixed in the direction of the dome 111 or the collar 112 and with regard to its lateral position in the upper part 11. If the housing 10 is closed by placing the lower part 12 on it and connecting the lower part 12 with the upper part 11, correspondingly shaped projections of the lower part 12 press on the still accessible edge of the clamping ring 33, wherein the latter is also positively fixed in the direction of the lower part 12 in the housing 10.

Figure 5:
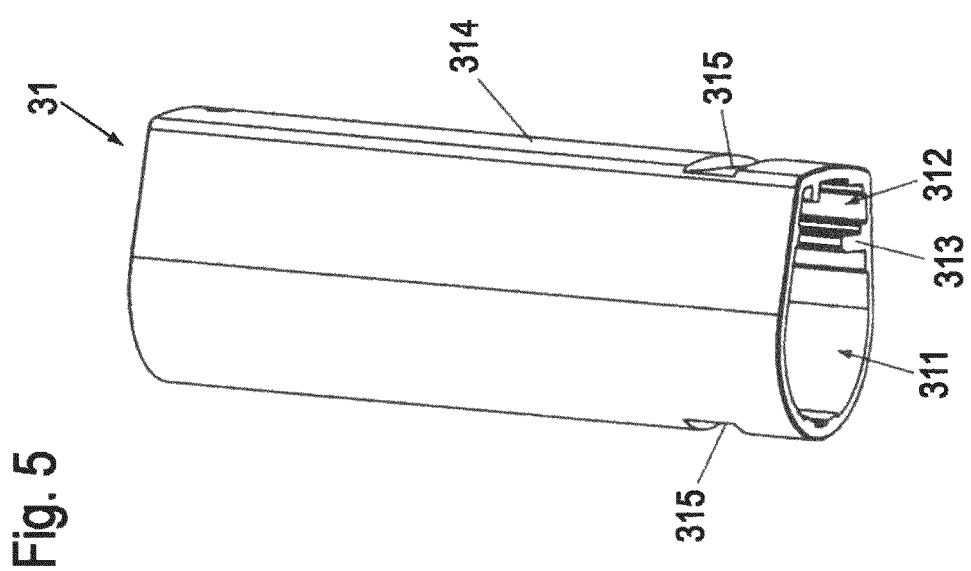
FIG. 5 shows an isometric representation of a standpipe of an electromotive furniture drive.

FIG. 5 shows the standpipe 31 separately in an isometric drawing. The standpipe 31 has an asymmetrical profile with a main shaft 311 in which the lift spindle 52 and the lifting tube 41 are located. The main shaft 311 has an approximately round cross-section. On a flattened side 314 of the standpipe 31 there is a limit switch shaft 212, also extending in a longitudinal direction, in which microswitches, which act as limit switches for the electromotive furniture drive, are positioned. Between the main shaft 311 and the limit switch shaft 312 there is an open connection over the entire length. Between the two shafts there is at least one longitudinal web 313 which also runs over the entire length. A spindle nut not shown here engages in this at least one longitudinal web 313 so that it can move in the longitudinal direction in the standpipe 31, but is secured against rotation.

On the flattened side 314 and also on the opposite curve, transverse grooves 315 are introduced into the standpipe 31 from the outside, into which the clamping ring 33 is inserted and by means of which the standpipe 31 is fixed in the housing 10 in the longitudinal direction with the aid of the clamping ring 33.

Figure 6A:
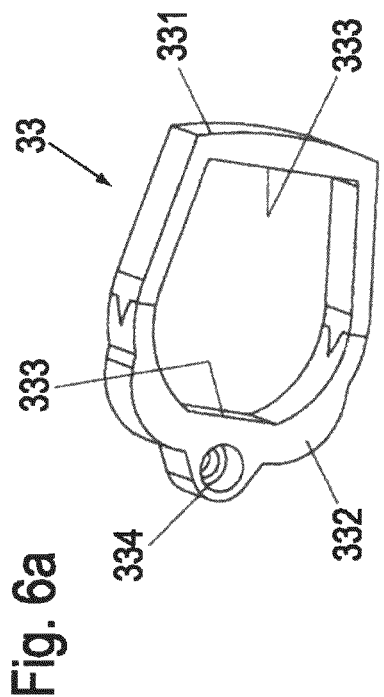
FIG. 6 shows two exemplary embodiments of clamping rings for fixing the standpipe of FIG. 5.
Figure 6B:
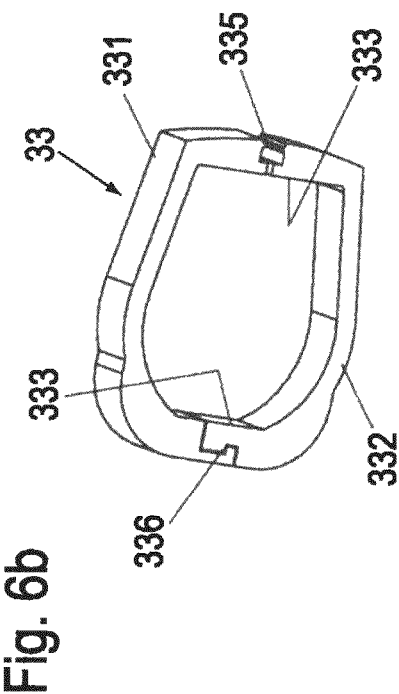

Two exemplary embodiments of suitable clamping rings 33 are shown in FIGS. 6a and 6b, each in an isometric diagram. The clamping ring 33 shown in FIG. 6a is the one also visible in FIG. 4. It is made up of two interlocking sections 331 and 332 in order to be able to insert the standpipe 31 into the transverse grooves 315. Accordingly, it has two straight webs 333 on the inside which engage in the transverse grooves 315. In the example in FIG. 6a, there is also a fastening possibility 334 for a screw or a locking head to hold the clamping ring 33 in position before closing the housing 10.

The alternatively usable clamping ring 33 as shown in FIG. 6b has two sections 331,332 which can be pivoted against each other and which are connected to each other on one side (in FIG. 6b on the right side) by a hinge 335. On the opposite side a latching mechanism 336 is provided to close the clamping ring 33. The resulting integral design of the clamping ring 33 simplifies the assembly process.

Figure 7:
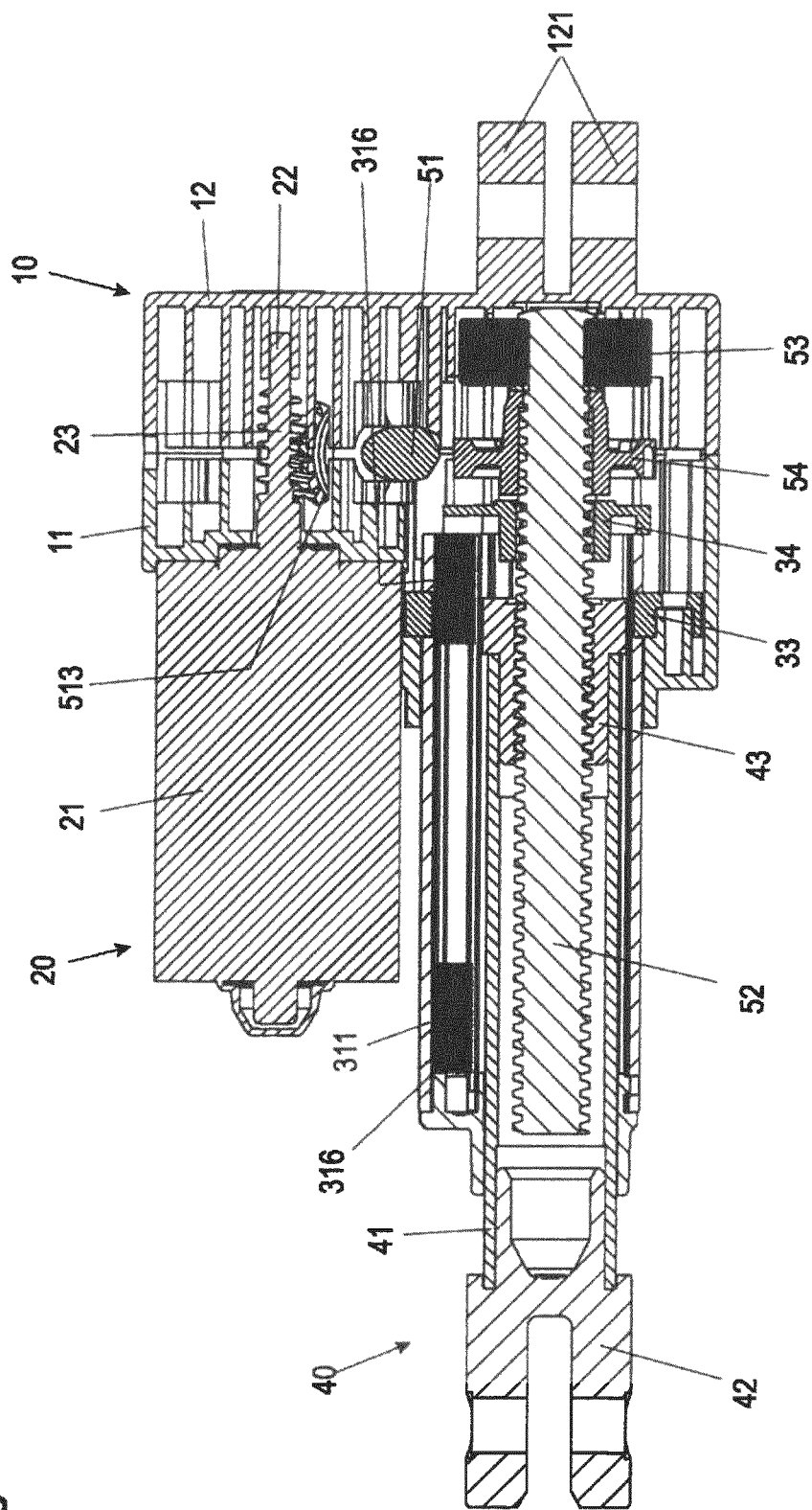
FIG. 7 shows a sectional view of the furniture drive of FIGS. 1 to 4.

FIG. 7 finally shows the overall design of the electromotive furniture drive of FIGS. 1 to 4 again in a sectional view. An offset section is selected in this illustration, in which the section in the area of the drive motor 20 extends in the center plane M (see FIG. 3). In the area of the standpipe 31 or lifting tube 41, the section extends in a parallel plane centrally through the lift spindle 52.

In this sectional view, the already mentioned spindle nut 43 and its engagement in the longitudinal webs 313, which separate the limit switch shaft 312 from the main shaft 311 of the standpipe 31, is visible. The spindle nut 43 is firmly connected to the lifting tube 41. When the lift spindle 52 rotates, the spindle nut 43 and thus the lifting tube 41 and the fork head 42 move linearly out of or into the standpipe 31.

Furthermore, this illustration shows two limit switches 316 which are actuated by an extension at the spindle nut 43 and switch off the drive motor 20 directly or via control electronics when one or the other end position is reached.

What is claimed is:

1. An electromotive furniture drive comprising:
    a drive motor including an output shaft and a motor housing;
    a lift spindle arranged in a common plane with the output shaft;
    a gear assembly configured to couple the output shaft of the drive motor to the lift spindle, said gear assembly including an intermediate shaft which intersects the common plane between the lift spindle and the output shaft;
    a standpipe;
    a lifting tube mounted in the standpipe such as to be linearly displaceable, said lifting tube being coupled to a spindle nut which interacts with the lift spindle; and
    a housing configured to accommodate the gear assembly, wherein the motor housing and the standpipe project parallel to one another on one side of the housing.

2. The electromotive furniture drive of claim 1, wherein the gear assembly is a double worm gear unit, said intermediate shaft including an intermediate wheel into which a worm of the output shaft of the drive motor engages, and a further worm which engages in a spindle wheel of the lift spindle.

3. The electromotive furniture drive of claim 1, wherein the gear assembly is a combination of a worm gear and a helical gear, said intermediate shaft including an intermediate wheel into which a worm of the output shaft of the drive motor engages, and a helical gear which engages in a helical gear of the lift spindle.

4. The electromotive furniture drive of claim 1, wherein the intermediate shaft intersects the common plane at an angle of 30° to 75°.

5. The electromotive furniture drive of claim 1, wherein the intermediate shaft intersects the common plane at an angle of 35° to 45°.

6. The electromotive furniture drive of claim 1, wherein the lift spindle and the output shaft extend parallel to one another and perpendicular to the intermediate shaft.

7. The electromotive furniture drive of claim 1, wherein the intermediate shaft includes an intermediate wheel which is defined by a diameter and into which a worm of the output shaft of the drive motor engages, said housing having two parallel longitudinal sides at a distance from one another, with the diameter of the intermediate wheel being greater than or equal to half the distance.

8. The electromotive furniture drive of claim 7, wherein the output shaft lies centrally between the parallel longitudinal sides, and wherein the lift spindle lies eccentrically between the parallel longitudinal sides.

9. The electromotive furniture drive of claim 7, wherein the distance substantially corresponds to a dimension of the motor housing in a direction of the distance.

10. The electromotive furniture drive of claim 1, wherein the housing has an upper part from which the motor housing, the drive motor and the standpipe project, and a lower part arranged on an opposite side.

11. The electromotive furniture drive of claim 10, further comprising plain bearings including bearing shells formed in the upper and lower parts of the housing, said intermediate shaft including bearing journals mounted in the plain bearings.

12. The electromotive furniture drive of claim 10, wherein a half-shell-shaped bearing shell in the upper part and a half-shell-shaped bearing shell in the lower part complement each other to form a plain bearing for a bearing journal of the intermediate shaft.

13. The electromotive furniture drive of claim 10, wherein the upper part has a raised dome in a region of the standpipe, said standpipe being inserted laterally in the dome in a form-fitting manner.

14. The electromotive furniture drive of claim 1, wherein the standpipe has an outer wall formed with a transverse groove, and further comprising a clamping ring placed around the standpipe and engaging in the transverse groove.

15. The electromotive furniture drive of claim 14, wherein the housing has an upper part and a lower part arranged on an opposite side, said clamping ring being held positively in a recess between the upper and lower parts.

16. The electromotive furniture drive of claim 14, wherein the clamping ring is formed from two sections which are insertable into one another.

17. The electromotive furniture drive of claim 14, wherein the clamping ring is formed from two sections which are connected to one another in a hinged manner via a hinge.

* * * * *